United States Patent
Oberschelp

[11] Patent Number: 6,024,254
[45] Date of Patent: Feb. 15, 2000

[54] APPARATUS FOR METERING VISCOUS COMPOSITIONS

[75] Inventor: Friedel Oberschelp, Enger, Germany

[73] Assignee: INT GmbH, Bielefeld, Germany

[21] Appl. No.: 09/100,800

[22] Filed: Jun. 19, 1998

[30] Foreign Application Priority Data

Jun. 21, 1997 [DE] Germany ............ 197 26 473

[51] Int. Cl.[7] ...................................... B67D 5/52
[52] U.S. Cl. .................. 222/146.5; 222/251; 222/333
[58] Field of Search .............. 222/63, 251, 146.5, 222/333, 386, 390

[56] References Cited

U.S. PATENT DOCUMENTS 5,026,187   6/1991   Belanger et al. ............... 222/146.5

FOREIGN PATENT DOCUMENTS 3129348    2/1983   Germany .
19513023   8/1989   Germany .
3803419    5/1993   Germany .
405212762  8/1993   Japan ............................ 222/63
508202     7/1971   Switzerland .

*Primary Examiner*—Kevin Shaver
*Assistant Examiner*—John P. Welsh
*Attorney, Agent, or Firm*—Richard M. Goldberg

[57] ABSTRACT

An apparatus for metering out viscous compositions includes a metering chamber (12) for metering out the viscous composition, a driving mechanism (16), which drives a displacer disposed in the metering chamber, an inlet valve (32), which is connected upstream from the metering chamber (12) and an outlet valve (38), which is connected downstream from the metering chamber (12) and, after the metering chamber (12) is filled, is opened up for discharging the metered-out viscous composition from the metering chamber (12). A threaded rod (14) is disposed longitudinally displaceably as displacer in the metering chamber (12). The threaded rod (14) is rotationally guided coaxially in a hollow shaft (18) of an electric motor (16) and engaged by way of threads with the hollow shaft (18).

16 Claims, 2 Drawing Sheets

APPARATUS FOR METERING VISCOUS COMPOSITIONS

BACKGROUND OF THE INVENTION

The invention relates to an apparatus for metering viscous compositions.

Metering apparatuses for metering viscous compositions are known. The viscous composition, which is to be metered, is supplied with the help of a pump, connected upstream from the metering chamber, over a delivery line to the metering chamber of the metering apparatus. The pump takes the viscous composition, for example, from a container. When filling the metering chamber, an inlet valve, which is disposed between the pump and the metering chamber, is opened, while the outlet valve, which is connected downstream from the metering chamber, is closed. After the metering chamber is filled, the inlet valve is closed and the valve opened.

A displacer, which is disposed in the metering chamber and, when the latter is being filled, moves into a position, in which the metering chamber has its largest volume, is moved with the help of a driving mechanism, such as an electric motor, into the metering chamber, so that the viscous composition, contained in the metering chamber, is displaced and discharged through the opened outlet valve to a delivery point.

When the displacer has reached a position, in which the metering chamber has its smallest volume, an amount of the viscous composition, corresponding to the displacement volume of the displacer, has been delivered to the removal site. Subsequently, the outlet valve is closed and the inlet valve opened, and the displacer is moved back to the starting position. The metering chamber is filled once again by the conveying action of the pump.

For the metering apparatus of the type named above, the metering chamber and the driving mechanism for the displacer, which can be shifted longitudinally in the metering chamber, represent two separate units, which are connected with one another over a driving element, such as a belt drive. This leads to a relatively bulky and expensive construction.

SUMMARY OF THE INVENTION

It is therefore an object of the invention to configure an apparatus in such a manner, that a particularly compact and Pursuant to the invention, this objective is accomplished by an apparatus for metering viscous compositions having the distinguishing features given in claim 1.

A threaded rod, which extends coaxially in a hollow shaft of an electric motor, which serves as its driving mechanism, is disposed longitudinally displaceably as displacer in the metering chamber of the apparatus. The hollow shaft is provided with a threaded internal section, such as a spindle nut fastened to at least one end of the hollow shaft, so that the threaded rod is displaced axially by the rotation of the hollow shaft. In this way, the driving mechanism is coupled to the displacer in a very simple and, moreover, compact manner, since the electric motor and the threaded rod are disposed in one line of action. Because of this arrangement, the rotational movement of the electric motor of the inventive metering apparatus is converted directly into a lifting motion of the threaded rod, the rotation of which is tied to that of the electric motor. When the electric motor is driven in the one direction, the threaded rod is moved into the metering chamber, so that the viscous composition, present in the metering chamber, is displaced from the latter. When the electric motor is driven in the other direction, the threaded rod is moved back into the starting position, in which in the metering chamber has its largest volume.

Electric motors with a hollow shaft are known and also available as standard motors, so that the inventive metering apparatus for viscous compositions can be produced cost effectively.

Preferably, the threaded rod is also hollow and part of the inlet system for introducing the composition into the metering chamber. Moreover, the diameter of the inlet duct in the threaded rod is small in comparison to the total diameter of the threaded rod, so that the function as displacer is ensured. The free end of the threaded rod, which is not disposed in the metering chamber, is connected with a flexible hose or the like, which follows the lifting motion of the threaded rod when driven by the electric motor.

The threaded rod and the spindle nut preferably are provided with a trapezoidal thread, so that the forces, acting on the threaded rod when the electric motor is rotating, can be absorbed without wear.

BRIEF DESCRIPTION OF THE DRAWINGS

In the following, preferred examples of the invention are explained in greater detail by means of the drawing, in which.

DETAILED DESCRIPTION

Figure 1:
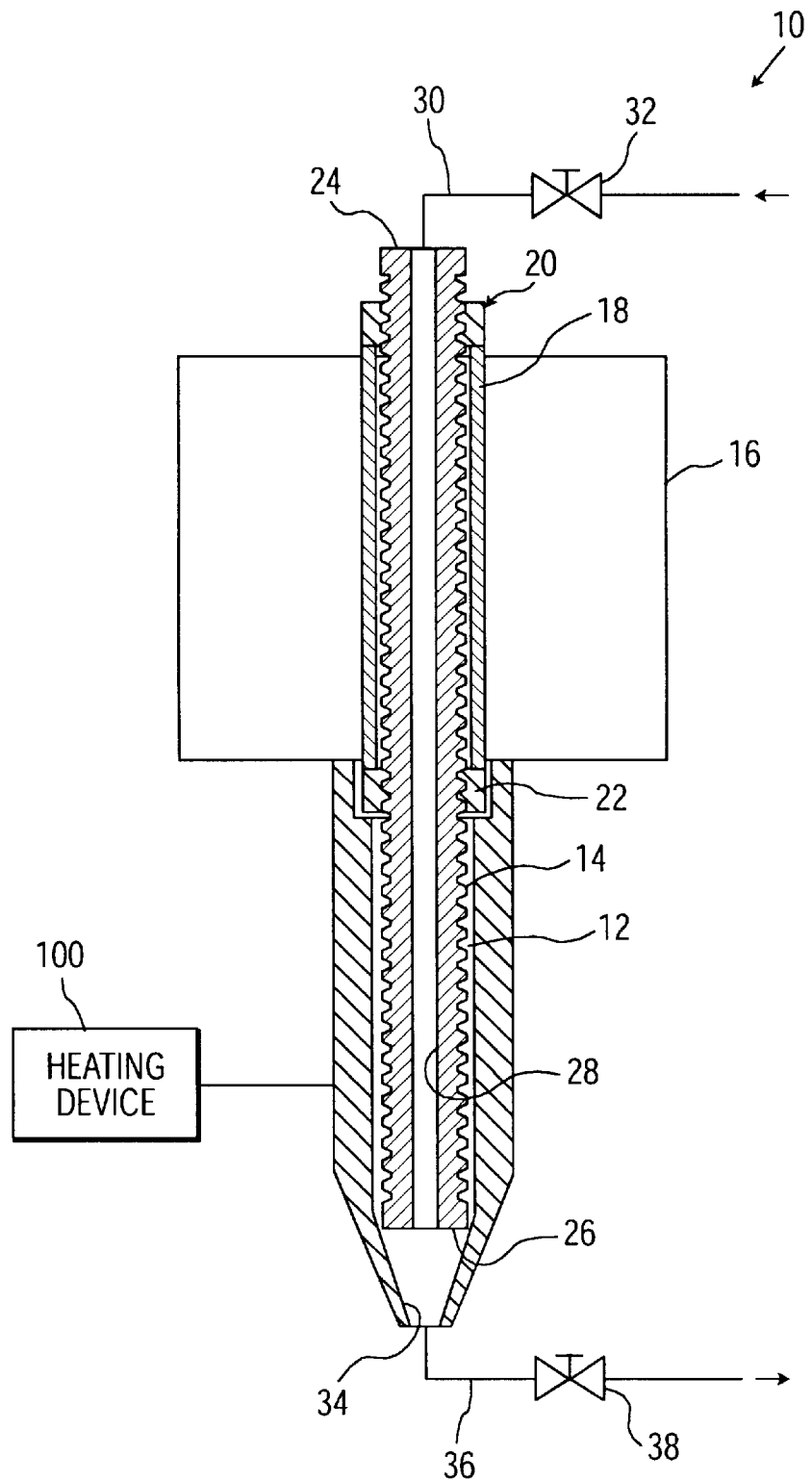
FIG. 1 is a longitudinal section through an inventive metering apparatus and shows a threaded rod, which can be shifted longitudinally in the metering chamber, in a first end position and FIG. 2 corresponds to the representation of FIG. 1 and shows the threaded rod in the second end position.
Figure 2:
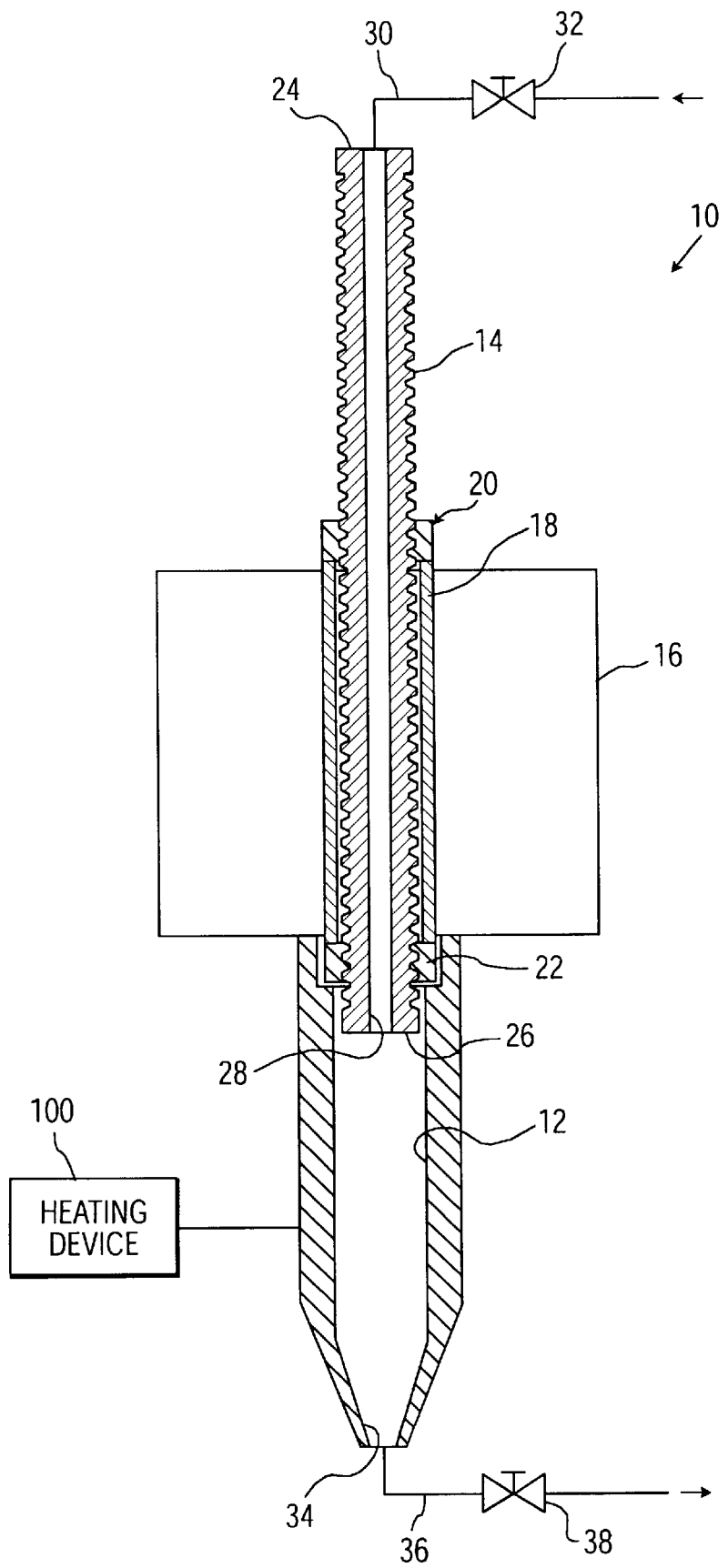

The concepts of "upper", "lower", etc., used in the specification, refer to the representation of the metering apparatus of FIGS. 1 and 2.

FIG. 1 shows a metering apparatus for viscous compositions, which is labeled 10 as a whole, works as a flowthrough metering apparatus and is formed from a cylindrical metering chamber 12, with a diameter that becomes smaller in the lower region, a threaded rod 14, which can be shifted longitudinally in the metering chamber 12 and serves as a displacer, and an electric motor 16 which is disposed above the metering chamber 12. The electric motor 16 is provided with a hollow shaft 18, through which the threaded rod 14 is passed. In the embodiment of the metering apparatus shown, the free ends of the hollow shaft 18 are each connected with a spindle nut 20, 22.

The threaded rod 14 engages the spindle nuts 20, 22 of the hollow shaft 18 of the electric motor 16 and is held by a guide, which is not shown, so that the rotational movement of the electric motor 16 is converted into a lifting movement. Advisably, the guide is disposed on the side of the electric motor opposite to the metering chamber.

In this way, as the motor rotates, the threaded rod is moved into the metering chamber in the one direction until a lower end position, which is shown in FIG. 1 and in which the volume of the metering chamber 12 has the smallest value, is reached. On the other hand, when the motor is rotated in the other direction, the threaded rod is moved out of the metering chamber into an upper end position, which is shown in FIG. 2 and in which the volume of the metering chamber 12 has the largest value.

In the example shown, the length of the threaded rod 14 is coordinated with the longitudinal extent of the metering chamber 12 and of the electric motor 16 or of the hollow shaft 18 so that, in the lower and upper end positions of the threaded rod, the upper or lower end region 24, 26 of the threaded rod protrudes only slightly from the spindle nut 20 or 22. The lifting motion of the threaded rod 14 can be controlled, for example, with the help of limit switches, which can be provided at appropriate positions at the guide, which is not shown in the drawing and guides the threaded rod rotation-proof.

In this connection, it should be mentioned that, in contrast to the embodiment shown in FIGS. 1 and 2, the threaded rod need be provided with a thread only over a length, which corresponds to the total lift of the threaded rod. If only one spindle nut is fastened to the hollow shaft 18 of the electric motor 16, only one longitudinal region need be provided with a thread, which corresponds to the lift.

In other respects, the threaded rod 14 and the spindle nuts 20, 22 are provided with a trapezoidal thread, which makes possible a high transfer of force with little wear.

As can be seen in FIG. 1, the threaded rod 14 is hollow and forms an inlet duct 28 for the viscous composition, such as an adhesive, which is to be metered. The upper end of the threaded rod is connected over a flexible hose 30, which can follow the lifting motion of the threaded rod, with an inlet valve 32, which can be triggered in a manner not shown with the help of a control system. Upstream from the inlet valve 32, a pump, which is not shown and which takes the viscous composition from a reservoir, such as a vat, is connected.

An outlet opening 34 of the metering chamber 12 is connected over a pipeline 36 with an outlet valve 38, which can also be triggered by the control system that is not shown. A removing site for the viscous composition, which is not shown, follows the outlet valve 38.

In the following, the mode of functioning of the inventive metering device 10 is explained with the help of FIGS. 1 and 2. In this connection, the starting point is the lower end position of the threaded rod shown in FIG. 1.

The threaded rod 14 is in the lower end position, in which the viscous composition, contained in the metering chamber 12, has been pressed essentially completely from said chamber 12. The outlet valve 38 is open, so that the viscous composition can reach a removal site, while the inlet valve 32 is closed. Subsequently, the electric motor 16 is triggered by the control system, which is not shown, in such a manner, that the motor turns in the direction, in which the threaded rod 14 is moved out of the lower end position into an upper position, which is shown in FIG. 2. At the same time, the outlet valve 38 is closed and the inlet valve open, so that the composition, with the help of the pump, reaches the metering chamber. The viscous composition is prevented from reaching the removal site directly by the closed outlet valve 38.

Subsequently, the inlet valve 32 is closed once again and the outlet valve opened and the electric motor 16 is triggered so that it rotates in the opposite direction and the threaded rod moves into the metering chamber 12. At the same time, the threaded rod 14 displaces the amount of viscous composition contained in the metering chamber 12 and forces it through the outlet valve 38 to the removal site. When the threaded rod 14 reaches its lower end position, an amount of viscous composition, which depends on the displacement volume of the threaded rod, has been delivered.

A heating mantle 100 keeps the viscous composition at a specified temperature in the metering chamber before it is forced out of the chamber, and is disposed in a simple manner about the metering chamber.

What is claimed is:

1. An apparatus for metering out viscous compositions, with an inlet valve and an outlet valve, said apparatus comprising:

a metering chamber for metering out the viscous composition, the metering chamber connected downstream from the inlet valve and upstream from the outlet valve;

a threaded rod longitudinally displaceably disposed as a displacer in the metering chamber, said threaded rod having external threads thereon; and a driving mechanism which drives the threaded rod in the metering chamber, the driving mechanism including:

an electric motor having a hollow shaft, with said threaded rod rotationally positioned coaxially in said hollow shaft, and an arrangement of internal threads fixedly connected with said hollow shaft, with said internal threads threadedly engaging said external threads of said threaded rod;

wherein, after the metering chamber is filled with the viscous composition, the outlet valve is opened up for discharging the metered-out viscous composition from the metering chamber and the threaded rod is advanced for discharging the viscous composition.

2. The apparatus of claim 1, wherein said arrangement includes a spindle nut which threadedly engages the threaded rod and is firmly fastened to at least one end of the hollow shaft of the electric motor.

3. The apparatus of claim 2, wherein the threaded rod is hollow and forms an inlet duct for the viscous composition into the metering chamber.

4. The apparatus of claim 3, wherein the threaded rod has an external diameter which is slightly smaller than an internal diameter of the metering chamber.

5. The apparatus of claim 4, wherein the threaded rod and the spindle nut each have a trapezoidal thread.

6. The apparatus of claim 5, further comprising a heating device disposed around the metering chamber.

7. The apparatus of claim 4, further comprising a heating device disposed around the metering chamber.

8. The apparatus of claim 3, wherein the threaded rod and the spindle nut each have a trapezoidal thread.

9. The apparatus of claim 3, further comprising a heating device disposed around the metering chamber.

10. The apparatus of claim 2, wherein the threaded rod has an external diameter which is slightly smaller than an internal diameter of the metering chamber.

11. The apparatus of claim 2, wherein the threaded rod and the spindle nut each have a trapezoidal thread.

12. The apparatus of claim 2, further comprising a heating device disposed around the metering chamber.

13. The apparatus of claim 1, wherein the threaded rod is hollow and forms an inlet duct for the viscous composition into the metering chamber.

14. The apparatus of claim 1, wherein the threaded rod has an external diameter which is slightly smaller than an internal diameter of the metering chamber.

15. The apparatus of claim 1, wherein the threaded rod and the spindle nut each have a trapezoidal thread.

16. The apparatus of claim 1, further comprising a heating device disposed around the metering chamber.

* * * * *